United States Patent [19]

Kraus

[11] Patent Number: 4,999,019
[45] Date of Patent: Mar. 12, 1991

[54] PLASTIC PART FOR ENGAGEMENT WITH A THREADED BOLT

[75] Inventor: Willibald Kraus, Grunstadt, Fed. Rep. of Germany

[73] Assignee: TRW United-Carr GmbH & Co., Enkenbach-Alsenborn, Fed. Rep. of Germany

[21] Appl. No.: 271,057

[22] Filed: Nov. 14, 1988

[30] Foreign Application Priority Data

Nov. 20, 1987 [DE] Fed. Rep. of Germany ....... 3739443

[51] Int. Cl.⁵ .............................................. F16B 21/00
[52] U.S. Cl. .................................... 411/512; 411/908; 411/437
[58] Field of Search ........ 411/433, 436, 437, 508–512, 411/908

[56] References Cited

U.S. PATENT DOCUMENTS

| 4,435,111 | 3/1984 | Mizusawa | 411/437 |
| 4,541,153 | 9/1985 | Schäty | 411/508 X |
| 4,547,108 | 10/1985 | Nakama | 411/508 X |
| 4,558,494 | 12/1985 | Kraus | 411/437 X |
| 4,728,236 | 3/1988 | Kraus | 411/437 |
| 4,770,582 | 9/1988 | Junemann et al. | 411/437 X |

FOREIGN PATENT DOCUMENTS

| 0153489 | 9/1985 | European Pat. Off. | 411/433 |
| 2179113 | 2/1987 | United Kingdom | 411/512 |

Primary Examiner—Gary L. Smith
Assistant Examiner—Flemminy Saether
Attorney, Agent, or Firm—Fay, Sharpe, Beall, Fagan, Minnich & McKee

[57] ABSTRACT

A plastic part 1 for engagement with threaded bolts, especially coarsely threaded bolts, includes an opening 2 with several elastic catch points 3 which, in the zone of engagement with the threads of the bolts, are provided with stepped graduations. Guide elements are located in the interspaces between the catch points 3 and are distributed in spaced relationship over the circumference of the opening 2. The guide elements 4 are designed springy or resilient and may be, for example, resilient hollow bodies or springy stays.

2 Claims, 1 Drawing Sheet

PLASTIC PART FOR ENGAGEMENT WITH A THREADED BOLT

BACKGROUND OF THE INVENTION

The invention relates to a plastic part or fastener for engagement with a threaded bolt, especially a coarsely threaded bolt. The part includes an opening with several elastic catch points distributed about the circumference of the opening. The catch points in the zone of engagement with the threads of the bolt are provided with stepped graduations or tooth-like formations. Guide elements are arranged in the interspaces between the catch points distributed over the circumference of the opening.

Such a plastic part is already broadly known, as state of the art, in which the guide elements are designed as rigid stays or ribs situated in the interspaces between the catch points. See, for example, U.S. Pat. No. 4,728,236. The guide stays are, in the noted patent, above the catch points and have the function of guiding the threaded bolt over the whole height of the plastic part. However, if excessive tolerance variations occur in the threaded bolt, these guide stays can no longer perfectly fulfill their guiding function.

Also belonging to the state of the art is a known nut-type fastening element having four slots lying in opposed relationship and connected with each other by arcform stays. See for example, U.S. Pat. No. 4,77,582. In this known construction, however, no elastic catch points are provided over the circumference of the opening. Consequently, engagement with the threaded bolt takes place only through the arc form, and is thus relatively insecure.

Also belonging to the state of the art is an element for the elastic fastening of objects, in which, from the inner circumference of a sheath or socket form plastic element, ridges run obliquely toward the center. The ridges pass into a common wall provided with triangular guide stays on the inner circumference. See West German Disclosure 1,625,332. Here also, the holding effect is only slight, since, finally, the triangular guide stays can only be supported in a threaded bolt.

BRIEF DESCRIPTION OF THE INVENTION

The present invention attacks the problem of designing a plastic part of the kind mentioned, so that an improvement of the guiding and the holding effect on a threaded bolt is attained. The holding effect is achieved independently of the tolerance range in which the threaded bolt lies.

The problem is solved, according to the invention, by the fact that the guide elements are, in each case, designed to be resilient and springy. Here, the guide elements may, in each case, be designed as hollow bodies, located against the inner circumference of the plastic part. This gives the advantage that, as a result of the springy design of the guide elements, especially as hollow bodies, an improvement of the holding effect and the guiding function of the plastic part is obtained. This is achieved even when the threaded bolts lie in a wide tolerance range a to their dimensions.

The hollow body forming the guide element may be designed polygonal and it may have equal wall thickness and be open at both ends. This hollow body may run over the length of the plastic part to a point below the catch points. Its radial inward extent or dimension may be less than the radial inward extent or dimension of the catch points. In this way there is obtained, advantageously, over the whole length of the plastic part, a perfect guiding of the coarsely threaded bolt.

The hollow body may have various shapes; for example, it may be designed cylindrical or wedge-shaped.

Instead of designing the guide element as a hollow body, it is also possible to shape it as a T form. In each case, the cross stay of the T form is directed to spring against the outer circumference of the threaded bolt, and fulfill the guiding function.

BRIEF DESCRIPTION OF THE DRAWINGS

The invention will be explained in detail below from examples of execution represented in the drawings.

DETAILED DESCRIPTION OF THE PREFERRED EMBODIMENTS

Figure 1:
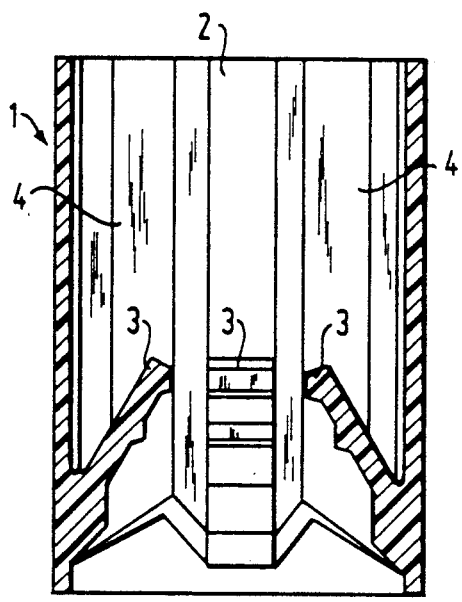
FIG. 1 is a side view of the plastic part, in section.
Figure 3:
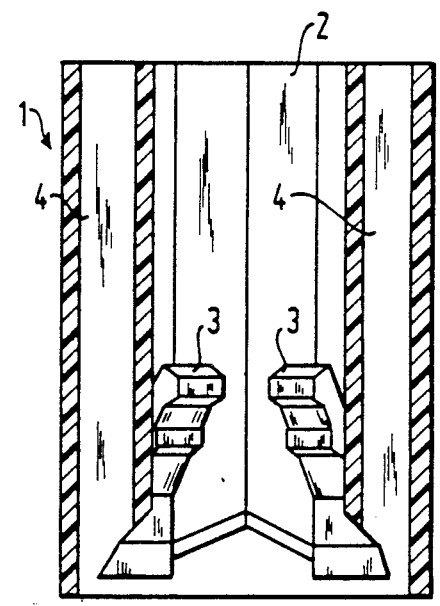
FIG. 3 is a section along the line III—III in FIG. 2.
Figure 2:
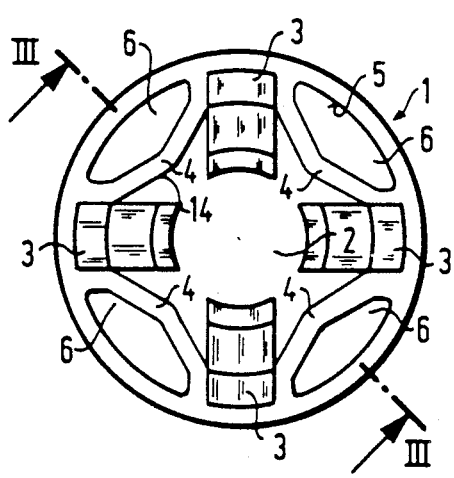
FIG. 2 is a top view of the plastic part in the form of construction according to FIG. 1.

According to the preferred embodiment of FIGS. 1 to 3, a plastic part 1 is used for the holding or fastening of a threaded bolt, especially a coarsely threaded bolt, not shown in detail. Here, the plastic part 1 has an axially extending opening 2, with several elastic catch points 3, distributed over the inner circumference of the opening 2. In the zone of engagement with the threads of the threaded bolt, the catch points 3 are provided with stepped graduations or thread engaging tooth forms. Between these catch points 3 are guide elements 4. The guide elements 4 are arranged in the interspaces between the catch points 3 and distributed in spaced relationship over the circumference of the opening 2.

In the embodiment according to FIGS. 1 to 3, the guide elements 4 are designed in each case as resilient hollow bodies 6 placed against the inner circumference 5 of the plastic part 1. The hollow bodies 6 are polygonal in shape. As can be seen from FIG. 2, each hollow body 6 is arranged between two catch points and extends by its outer wall to the adjoining side wall of the neighboring catch point. Thus, the interspace between two neighboring catch points is completely filled out by the hollow body 6, which has the same wall thickness in each case. The part 14 of the hollow body is directed against the threaded bolt and is designed with an arched shape so that a springy and resilient guide function is given, as a whole, for the threaded bolt. The hollow body 6 is open at both ends in this embodiment and it can be seen from FIGS. 1 and 3 that the hollow body runs over the entire length of the plastic part 1 to a point below the catch points 3. The radial inward extent or radial height of the hollow body 6 between the individual catch points 4 is less than the radial inward extent or radial height of these catch points. In this way, the threaded bolt, set in from below, will always receive at once a perfect springy guiding and centering after which the graduations of the elastic catch points will come into use and can be lodged, accordingly, in the threads of the threaded bolt.

Figure 4:
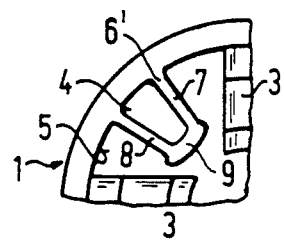
FIGS. 4 to 7 are different possibilities of execution of the shape of the guide element, partly broken away.

In the form of construction according to FIG. 4, the hollow body 6' has, in each case, two side walls 7 and 8, spaced a distance from each other. The walls 7 and 8 extend generally radially inwardly from the inner wall surface 5 of the opening 2 and are connected with each other by a transverse wall 9. In this case, the transverse wall 9 is designed with a curved or arched configuration so that, again, a very good guiding function is given for the threaded bolt that is received in the opening 2.

Figure 5:
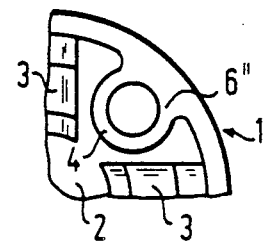

In the form of construction of FIG. 5, the hollow body 6″ is designed to have a cylindrical shape. Thus, in this configuration also, the hollow body 6″ is in a position to resilient guide the threaded bolt which is received in the plastic part 1.

Figure 6:
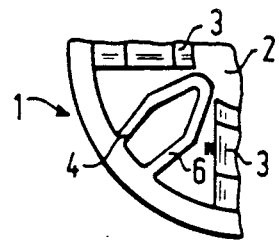

In the form of construction according to FIG. 6, the hollow body 6′″ is designed with a wedge shape and has its front tip arranged to extend toward the threads of the threaded bolt.

Figure 7:
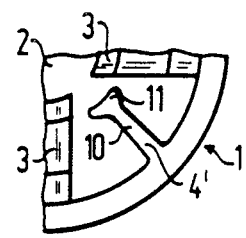

While in the above forms of construction, the guide elements 4 are always designed as specially shaped hollow bodies, it is possible, according to FIG. 7, to design this guide element 4′ as a T-shaped element. In the FIG. 7 construction the T-form 10 is limited, in the front zone, by a cross stay 11 which is designed with an arch at the end. In this way also, a threaded bolt receives a spring or resilient guiding over the whole length of the plastic part 1.

Figure 8:
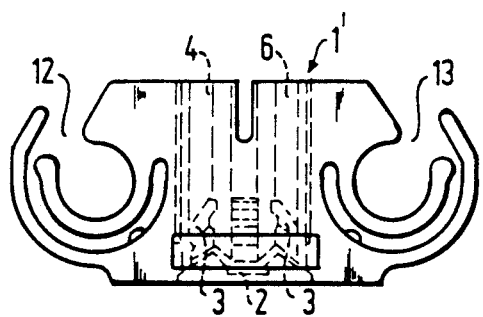
FIG. 8 is a side view of a plastic part with the guide elements according to the invention.

In FIG. 8 is shown one example of execution of such a plastic part 1′, for example, a pipeline clip with the two holding zones 12 and 13 for pipes. In the middle of the plastic part 1′ is the opening 2, into which, extending over almost the whole length, hollow bodies according to the construction form of FIG. 6, extend as guide elements. In the lower third of the plastic part 1 are the elastic catch points 3 with the stepped or graduated form.

On the whole, the springy or resilient guide elements, whether as hollow bodies or as single springy configurations, give the advantage that a threaded bolt, especially a coarsely threaded bolt, set into the plastic part 1 or 1′, receives a perfect guiding over almost the whole length of the plastic part. Indeed, perfect guiding is achieved even when the threaded bolt has a somewhat greater or somewhat smaller tolerance range. Consequently, with this invention, the range of use of such a plastic part is considerably expanded.

What is claimed is:

1. A plastic part for connection to a threaded bolt comprising:

a plastic body having an axially extending opening sized to axially receive a threaded bolt;

a plurality of elastic catch elements distributed about the inner circumference of the opening and extending radially inwardly of said opening to a diameter less than the diameter of a bolt received in the opening for engagement with the threads of said bolt, said catch elements provided with stepped graduations in the zone of engagement with the threads of said bolt;

guide elements extending longitudinally of the opening and distributed over the inner circumference in the interspaces between the catch elements, said guide elements being hollow and radially resilient and extending radially inward of said opening to a diameter which is located radially outward of the catch elements for guiding and centering a threaded bolt received in said opening; and, each hollow guide element being of polygonal cross-sectional shape and located between two catch elements and extending, bu an outer wall thereof, to the adjoining side walls of the neighboring catch elements.

2. A plastic part for connection to a threaded bolt comprising:

a plastic body having an axially extending opening sized to axially receive a threaded bolt;

a plurality of elastic catch elements distributed about the inner circumference of the opening and extending radially inwardly of said opening to a diameter less than the diameter of a bolt received in the opening for engagement with the threads of said bolt, said catch elements provided with stepped graduations in the zone of engagement with the threads of said bolt;

guide elements extending longitudinally of the opening and distributed over the inner circumference in the interspaces between the catch elements, said guide elements being hollow and radially resilient and extending radially inward of said opening to a diameter which is located radially outward of the catch elements for guiding and centering a threaded bolt received in said opening; and, each hollow guide element being of cylindrical cross-sectional shape and located between two catch elements.

* * * * *